Patented Oct. 23, 1923.

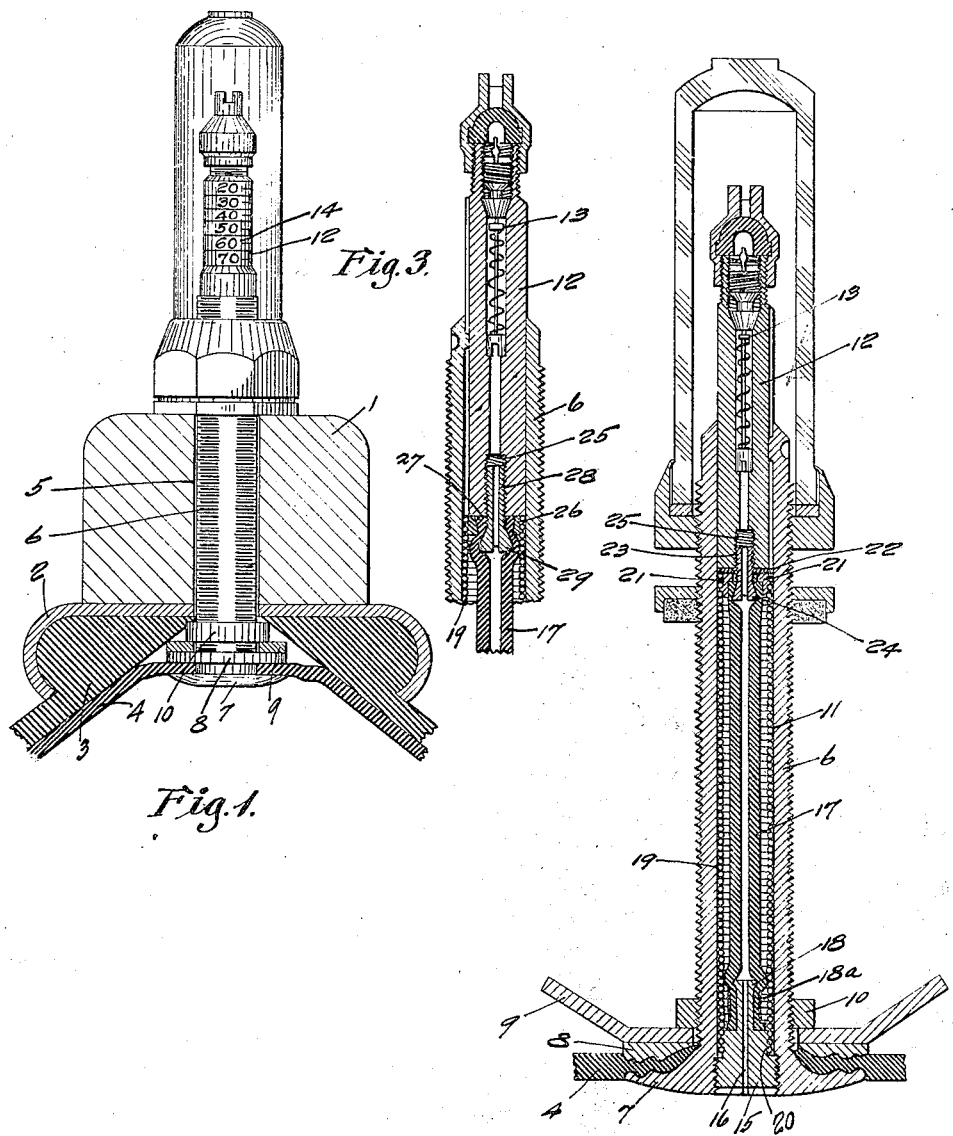

1,471,324

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TIRE-STEM PRESSURE GAUGE.

Application filed October 19, 1921. Serial No. 508,728.

*To all whom it may concern:*

Be it known that I, ALFRED BADOWSKI, a citizen of the United States, residing at Charleston, in the county of Kanawha and State of West Virginia, have invented new and useful Improvements in Tire-Stem Pressure Gauges, of which the following is a specification.

Tire stem pressure gauges have been formed with a sleeve in which there is a movable plunger, the movable plunger having an inflation passage through it and having its communication with the interior of the sleeve maintained by a rubber or extensible tube. A spring is also usually provided for sustaining the pressure, the plunger indicating by its movement the inflation pressure. The present invention is directed to the manner of securing the tube to the plunger and also the spring.

The invention is illustrated in the accompanying drawings as follows:—

Fig. 1 shows a section through a felloe with a pressure gauge in place thereon.

Fig. 2 a central section through a pressure gauge.

Fig. 3 a section of the upper part of the gauge indicating a modification from that shown in Fig. 2 and which construction is preferred.

1 marks the felloe, 2 the rim, 3 the tire, 4 the tube, and 5 an opening through the felloe for the tire stem.

The stem is in the form of a sleeve 6 having a head 7 and the tube is clamped between the washer 8, plate 9 and the head 7, pressure being exerted by the clamping nut 10. The sleeve has an opening 11 extending through it and a movable plunger 12 is slidingly mounted in this opening, the plunger carrying the usual inflation valve 13. The plunger is provided with a scale 14 which indicates as the plunger moves the pressure inducing the movement. An anchor plug 15 is screwed into the lower end of the opening 11 and is provided with an opening 16 extending through it. A rubber tube 17 is secured to a nipple 18 at the upper end of the plug by a binding material 18ª and a spring 19 is secured on the threads 20 also arranged on the anchor plug.

The upper end of the tube is carried in a ring 21 as shown in Fig. 2. A gasket 22 is arranged between the ring and the end of the plunger. A screw 23 has its head 24 arranged within the tube and clamps the end of the tube against the wall of the ring, the screw extending into a screw-threaded opening 25 in the plunger, thus securing the tube to the plunger and clamping the gasket 22. The spring 19 is secured on screw threads arranged on the periphery of the ring 21.

In the construction shown in Fig. 3 the rubber tube extends through a ring 26, the end 27 of the tube forming in itself a gasket on the end of the plunger. A screw 28 has a head 29 arranged in the tube 17 and is of sufficient size to clamp the tube against the walls of the ring 26, the screw extending into the screw-threaded opening 25 as in the construction shown in Fig. 1. In this construction it will be seen that the screw pressure acting on the tube not only secures the tube to the plunger but seals the connection between the plunger and the tube so as to prevent leakage.

What I claim as new is:—

1. In a tire stem pressure gauge, the combination with a sleeve; a plunger in the sleeve indicating by its movement the pressure in the sleeve, said plunger being provided with an inflation passage to which leads a screw-threaded opening; a rubber tube forming an extensible means of communication from the plunger to a stationary part of the sleeve; of a ring around the end of the tube detached but adjacent to the plunger; and a screw having its head within the tube clamping the rubber within the ring and extending into the screw-threaded opening in the plunger to secure the tube to the plunger.

2. In a tire stem pressure gauge, the combination with a sleeve; a plunger in the sleeve indicating by its movement the pressure in the sleeve, said plunger being provided with an inflation passage to which leads a screw-threaded opening; a rubber tube forming an extensible means of communication from the plunger to a stationary part of the sleeve; of a ring around the end of the tube detached but adjacent to the plunger; and a screw having its head within the tube clamping the rubber within the ring and extending into the screw-threaded opening in the plunger to secure the tube to the plunger, the end of the tube extending through the ring and forming a seal at the end of the plunger.

3. In a tire stem pressure gauge, the combination with a sleeve; a plunger in the sleeve indicating by its movement the pressure in the sleeve, said plunger being provided with an inflation passage to which leads a screw-threaded opening; a rubber tube forming an extensible means of communication from the plunger to a stationary part of the sleeve; of a ring around the end of the tube detached from but adjacent to the plunger; a screw having its head within the tube clamping the rubber within the ring and extending into the screw-threaded opening in the plunger to secure the tube to the plunger; and a spring secured to the ring resisting the movement of the plunger.

4. In a tire stem pressure gauge, the combination with a sleeve; a plunger in the sleeve indicating by its movement the pressure in the sleeve, said plunger being provided with an inflation passage to which leads a screw-threaded opening; a rubber tube forming an extensible means of communication from the plunger to a stationary part of the sleeve; of a ring around the end of the tube detached from but adjacent to the plunger; a screw having its head within the tube clamping the rubber within the ring and extending into the screw-threaded opening in the plunger to secure the tube to the plunger; and a spring secured to the outer periphery of the ring resisting the movement of the plunger.

5. In a tire stem pressure gauge, the combination with a sleeve; a plunger in the sleeve indicating by its movement the pressure in the sleeve, said plunger being provided with an inflation passage to which leads a screw-threaded opening; a rubber tube forming an extensible means of communication from the plunger to a stationary part of the sleeve; of a ring around the end of the tube detached from but adjacent to the plunger; a screw having its head within the tube clamping the rubber within the ring and extending into the screw-threaded opening in the plunger to secure the tube to the plunger, the end of the tube extending through the ring and forming a seal at the end of the plunger; and a screw screwed on to the outer periphery of the ring and resisting the movement of the plunger.

In testimony whereof I have hereunto set my hand.

ALFRED BADOWSKI.